Nov. 15, 1949  H. F. SHANNON  2,487,945
AIRFOIL AND APPARATUS FOR CREATING
A THRUST OR TRACTION EFFORT
Filed July 30, 1947
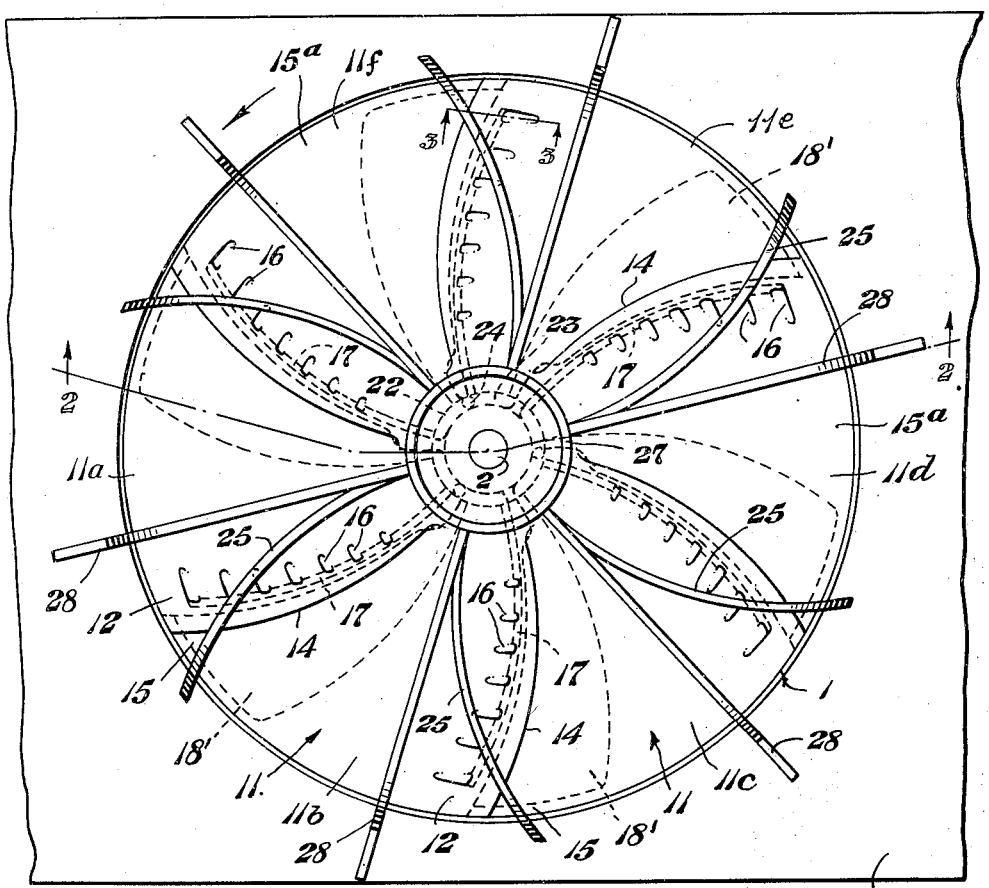
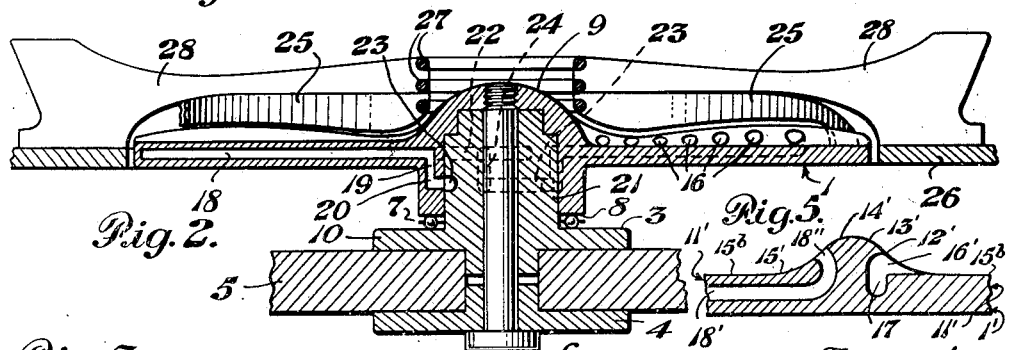
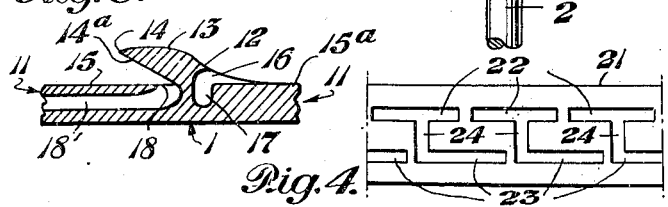
Inventor
Howell P. Shannon,
Almon S. Nelson
Attorney Patented Nov. 15, 1949

2,487,945

UNITED STATES PATENT OFFICE 2,487,945

AIRFOIL AND APPARATUS FOR CREATING A THRUST OR TRACTION EFFORT

Howell F. Shannon, Richmond, Va.

Application July 30, 1947, Serial No. 764,774

17 Claims. (Cl. 253—36)

This invention relates to an apparatus for creating a thrust or traction effort by means of a developed vacuum and pressure effect, and the primary object of the invention is to provide an airfoil or aerofoil comprising a plurality of segments in which the action of each segment is intermittent or interrupted rhythmatically thereby providing intervals of lesser or greater air forces acting on the airfoil.

At the present, airfoils act with continuous and sustained lessened or increased air pressure upon their surfaces at appreciable distances from the airfoil. The creation of such vacuum at appreciable distances from the surface of the airfoil results in loss in efficiency due to the extremly great amount of power required to produce such vacuum, and it is an object of my present invention to greatly reduce such power requirements while still producing the same amount of vacuum, but only throughout a short distance from the surface of the airfoil. By these means a powerful but slow lift at the least expense of movement of the air is possible.

A further object of the invention is to provide an apparatus for lifting an airplane, helicopter or similar device either wholly or in part by means of a rotor comprising a plurality of segments in which alternate segments function to create a vacuum while low pressure areas of intermediate segments are simultaneously connected by means of vents and passages to high pressure areas of said alternate segments, whereby the air pressure above such intermediate segments is neutralized or returned to substantially atmospheric pressure.

Other and further objects of the invention will become apparent as the description proceeds, reference being made to the accompanying drawing forming a part of the present disclosure wherein:

Fig. 1 is a plan view of an airfoil device constructed in accordance with my invention;

Fig. 2 is a sectional view taken in the plane of the irregular line 2—2 of Fig. 1;

Fig. 3 is a fragmentary sectional view taken in the plane of line 3—3 of Fig. 1; and Fig. 4 is a developed plan view of the periphery of the boss received in the hub of the rotor.

Fig. 5 is a fragmentary sectional view similar to Fig. 3 of a modification.

Referring in detail to Figs. 1 to 4 of the drawing, it will be seen that my airfoil comprises a rotor generally indicated by reference numeral 1, rigidly connected in any desired manner to a shaft 2. The shaft 2 is rotatably mounted in a bearing structure 3, 4, which is rigidly connected to a frame 5 in any desired manner. A thrust collar or bearing 6 is provided on the shaft 2 subjacent the bearing 4 and a second thrust ball bearing 7 in engagement with the lower edge 8 of the hollow hub 9 of the rotor 1 rests upon a shoulder 10 of the bearing 3.

The rotor 1 comprises a plurality of segments 11 and for the purpose of the present disclosure, six such segments 11a, 11b, 11c, 11d, 11e and 11f have been illustrated. It is to be understood, however, that more or less segments may be used as desired.

The structure of each of the segments is identical with each other segment; hence, a description of one will suffice for all.

The upper surface of each segment 11 adjacent the leading edge thereof is of concave or inverted cambered configuration, as indicated by reference numeral 12. The forward edge of the concave portion 12 terminates in a convexly curved surface 13 and the forward edge 14 of this curved surface forms the leading edge of each of the segments 11. Preferably the leading edge 14 of each segment is curved convexly longitudinally thereof, and as illustrated, the leading edge 14 of each segment is positioned or spaced outwardly relative to the central portion 15a of its own and the adjacent segment 11. Rearwardly of the surface 13 and adjacent thereto in the concave surface 12, a series of spaced openings or ports 16 is provided. These openings 16 communicate with a conduit means or manifold 17 in each segment leading to the central portion of the hollow hub 9 and communicating therewith.

Below the leading edge 14, each segment is inclined downwardly and rearwardly, as indicated at 14a and a radially extending, elongate opening 18 is provided in the trailing edge portion 15 of each segment, said opening being positioned substantially at the base of the surface 14a of the rearwardly adjacent segment. The opening 18 extends to a point adjacent the hub 9 and communicates with a relatively wide passageway 18' formed in the body of the rotor 1 in the trailing edge portion 15 of each segment. At its inner end the passage 18' is directed downwardly, as indicated at 19, and then outwardly into the hollow hub 9 as indicated at 20.

The bearing 3 is provided with a boss 21 extending into the hub 9 of the rotor 1 and this boss 21 is provided with a plurality of grooves. At an upper level in alignment with the manifold 17 of each segment is a series of three spaced grooves 22. The number of grooves 22 provided will obviously vary with the number of segments 11 used, there preferably being an even number of segments and a groove 22 provided for each two segments 11.

Subjacent the grooves 22 and in alignment with the passage 20 of each segment is also a series of three grooves 23 similar to the grooves 22 but staggered in relation thereto. Vertical passages 24 communicate the passages 23 with an adjacent passage or groove 22.

Referring to Fig. 4, it will be seen that each passage 22 and the passage 23 connected thereto by the passage 24, together extend through an angle of approximately 180°. This angle may be increased or decreased as conditions dictate or require, but in the present instance, the relationship provides for substantially equal vacuum creating and pressure equalizing intervals for each segment.

In operation, the shaft 2 is driven by any suitable motor means to rotate the rotor 1 in a counter-clockwise direction, as viewed in Fig. 1. As pointed out above, the leading edge 14 of each segment is spaced a very small distance above the trailing edge portion 15 of its adjacent segment and hence, in the rotation of the rotor 1 a very small or shallow bite of air is taken. As the rotor rotates, the air in passing relatively over the curved surface 13 and then over the concave surface 12 creates a reduced pressure area adjacent the openings 16 in a manner similar to the well known Venturi effect. This action occurs simultaneously on all segments 11, but is neutralized at three segments and in the position illustrated in Fig. 1, effective vacuum is being created only at the three segments 11a, 11c and 11e.

During the time that the effective vacuum is being produced above the segments 11a, 11c and 11e, a pressure neutralizing action is taking place in connection with or above the three segments 11b, 11d and 11f. As indicated above, a pressure area is created above the trailing edge portions 15 of each segment and this is utilized in the manner now to be described to increase the pressure above the concave surfaces 12 of the segments 11b, 11d and 11f at the position illustrated in Fig. 1. Referring to Fig. 1, it will be seen that the ports or openings 16 of the segment 11f communicate through the manifold 17, groove 22, passage 24 and groove 23, with the passage 18' of the segment 11e. In a similar manner openings 16 in the segments 11b and 11d communicate with the passages 18' in the segments 11a and 11c, respectively. The segments 11f, 11b and 11d may thus be considered to be in open port position and the segments 11a, 11c and 11e in closed port position, at this time.

The relatively small bite of air taken by each leading edge 14 of the segments, and also the air passing rearwardly over each segment, results in a high pressure area at each trailing edge portion 15 of each segment. As just indicated, however, this high pressure air from each of the segments creating the effective vacuum is passed to another respective segment whose parts are open to increase or neutralize the low pressure at the forward area thereof, the air then passing radially off of the respective segments whose parts are open due to centrifugal force. Obviously, after operation as just described through approximately 60°, the segments 11b, 11d and 11f are utilized to create the effective vacuum, and the low pressure areas of the segments 11a, 11c and 11e are connected with the high pressure areas of the segments 11b, 11d and 11f, respectively, the air now being thrown radially off the segments 11a, 11c and 11e, as described above. In this manner, the segments alternatively function to create the effective vacuum, and to displace the air column thereabove.

As indicated above, the total angle through which the associated or connected grooves 22 and 23 extend is sufficient that communication between the associated openings 16 and passage 18' lasts throughout approximately 60° or more. Communication is then broken for 60° or less, reestablished for 60° or more, etc. The arrangement of the grooves 22, 23 and 24 in the boss 21 is thus such that the communication between the various openings and passages is intermittently established and the effective vacuum created by each of the segments is also intermittent. In the arrangement illustrated the vacuum is created and destroyed above each segment approximately three times each revolution of the rotor. If the rotor is rotating at 2,000 R.P.M., the two triads of segments produce 200 effective vacuum impulses per second. The action is therefore rhythmatic and each impulse is of very short duration. Hence the curvature of the concave surface 12 of each segment may be such as to approach stall position, but before stalling can occur, the vacuum is neutralized or destroyed. Thus a powerful lift is provided with a minimum expenditure of power.

A plurality of substantially radially extending vanes 25 are stationarily mounted above the rotor 1 by connecting the same to a suitable stationary support 26. The member 26 may be connected in any suitable manner to the frame structure of the aircraft device. It will be noted that each of the vanes 25 is curved forwardly in the direction of the rotation of the rotor. These vanes 25 function to direct outwardly any turbulent air above the level of the curved surface 13; and also function to so direct the air being thrown radially outwardly by centrifugal force, above described. At their ends the vanes 25 are connected to a structure comprising a plurality of rings 27 to which is also connected another series of vanes 28 positioned generally above the vanes 25. The vanes 28 extend radially from the rings 27 and are rigidly connected with the supporting member 26. The vanes 28 tend to counteract any tendency for the air column above the rotor to rotate due to the action of the rotor.

Thus, when the device is operating, the air column above the rotor is disturbed as little as possible and passes downwardly and thence outwardly by centrifugal force to the edges of the rotor where increased air pressure is formed by centrifugal action and the air pressure that is developed by the vacuum action on the segments causing the air to be thrown off at the periphery of the rotor.

The bite of the rotor as mentioned above is very slight, and only those segments that are creating the effective vacuum are drawing the air downwardly. This means that only a small portion of the air column above the rotor at any one time has to be displaced to the outer edges of the rotor and be disposed of.

The manifold 17 and the ports 16 in the low pressure area of the segments are of such size and proportion to readily receive the air from the high pressure areas at the rearward edge portions of the segments. This is a balancing factor that will return the air to a normal air pressure so that the air above the next segment, as this segment goes into a closed port position, will be as undisturbed as possible. The volume of air above the rotor will have a tendency to go into rotation in the direction of rotation of the rotor, and if it were not for the fact that the air is balanced over each segment with its ports 16 open, it would be necessary to pass off a great quantity of air or else the leading edges of each segment would soon be moved into a compressed air area or into an area of less condensed or low pressure air and the rotor would become inoperable. Due to the intermittent or interrupted action disclosed, however, for allowing the vacuum and air pressure to be equalized just before the ports are closed, an action of vacuum is caused on top of the rotor with a chamber for the condensed air that will immediately follow behind it, and a vacuum of high quality is gained over the segments at which the ports 16 are closed. This functions to keep the rotor in balance insofar as the air pressures are concerned on top with only a small amount of air to be disposed of rather than a great quantity. The rotor of the present invention is not designed to have a fast upward lift, but it is designed to give a powerful but slow lift at the least expense of the movement of the air as possible.

When the ports 16 are closed and before the segment has moved to the open position for such ports, it will be found that the vacuum created in the closed port position will be of the highest efficiency possible without the crowding back into the vacuum area the air pressure that is built up on the trailing area of this segment. As the high vacuum is gained, however, the air pressure that is being developed will partially flow over the leading edge of and into the next segment and is equalized there at the same time it is finding a position by centrifugal force, more outwardly at all times, toward the periphery of the rotor where it is thrown off. The air pressure in front of this leading edge will help to throw off this air outwardly, as will also the vanes 25 and the convex shape of this leading edge, and dispose of all of the air that has been brought down by the airfoil segments operating in the manner above described.

Obviously modifications may be made in the port and air passage structure, it being only necessary that said port and passage structure function to connect a high pressure area of one segment with a low pressure area of the same or another segment at the proper time.

Fig. 5 of the drawings illustrates a modified form of segment which may be used. The upper surface of each segment 11' adjacent the leading edge portion thereof is of concave or inverted cambered configuration, as indicated by reference numeral 12'. The forward edge of the concave portion 12' terminates in a convexly curved surface 13' and the forward edge portion 14' of this curved surface forms the leading edge of each of the segments 11'. Preferably, as before, the leading edge portion 14' of each segment is curved convexly longitudinally thereof. The leading edge portion 14' of each segment is positioned or spaced outwardly relative to the central portion 15b of its own and the adjacent segment 11'. However, in this modified form of the invention the trailing edge portion 15' of each segment is of concave or inverted cambered configuration extending upwardly and blending into the curved surface 13' at the forward edge portion 14'. Rearwardly of the surface 13' and adjacent thereto in the concave surface 12' a series of spaced openings or ports 16' is provided. These openings 16' communicate with the manifold 17 leading to the central portion of the hollow hub 9 and communicating therewith as described above in connection with the first disclosed embodiment.

A series of spaced openings 18'' is provided in the concave trailing edge portion 15' of each segment. The openings 18'' communicate with the relatively wide passageway 18' previously described.

The operation of this modified embodiment of the invention is identical with the operation previously described in connection with the first embodiment disclosed. A relatively shallow bite of air is taken, as previously described, but in the present case, more of this air is passed rearwardly over the surface 13' to the next adjacent segment.

As is obvious from Fig. 5, the segments 11' are connected to provide the rotor 1' with an upper surface of corrugated configuration, the ridges of which each have concave side surfaces blending into a convex top surface.

From the foregoing it will be obvious that I have provided an improved rotor, impeller or airfoil device for aircraft and a new method of operation whereby a maximum lift is provided with a minimum expenditure of power.

Modifications coming within the scope of the following claims may be made without departing from the spirit of the invention.

I claim:

1. An airfoil device comprising a rotor including a hollow hub, means mounting said rotor for rotation, said rotor comprising a plurality of segments, said segments each having a concave surface rearwardly of and adjacent the leading edge thereof, the leading edge portion of each segment being positioned outwardly relative to the central portion thereof and being convex longitudinally, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, an elongate opening in each said segment in the trailing edge portion thereof communicating with said passage, said mounting means including a boss extending into said hollow hub, and passageways in said boss for intermittently communicating said passage in each of said segments with a respective manifold of one of said segments, and a plurality of radially extending, stationary vanes above said rotor.

2. An airfoil device comprising a rotor including a hollow hub, means mounting said rotor for rotation, said rotor comprising a plurality of segments, said segments each having a concave surface rearwardly of and adjacent the leading edge thereof, the leading edge portion of each segment being positioned outwardly relative to the central portion thereof and being convex longitudinally, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, an elongate opening in each said segment in the trailing edge portion thereof communicating with said passage, said mounting means including a boss extending into said hollow hub, and passageways in said boss for intermittently communicating said passage in each of said segments with a respective manifold of one of said segments.

3. An airfoil device comprising a rotor including a hollow hub, means mounting said rotor for rotation, said rotor comprising a plurality of segments, said segments each having a concave surface rearwardly of and adjacent the leading edge thereof, the leading edge portion of each segment being positioned outwardly relative to the central portion thereof, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, an opening in each said segment in the trailing edge portion thereof communicating with said passage, and means intermittently communicating said passage in each of said segments with a respective manifold of one of said segments.

4. An airfoil device comprising a rotor including a hollow hub, means mounting said rotor for rotation, said rotor comprising a plurality of segments, said segments each having a concave surface rearwardly of and adjacent the leading edge thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, an opening in each said segment in the trailing edge portion thereof communicating with said passage, and means intermittently communicating said passage in each of said segments with a respective conduit means of one of said segments.

5. An airfoil device comprising a rotor including a hollow hub, means mounting said rotor for rotation, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, said trailing edge portion having a concave surface, an opening in each said segment in the trailing edge portion thereof communicating with said passage, and means intermittently communicating said passage in each of said segments with a respective conduit means of one of said segments.

6. An airfoil device comprising a rotor including a hollow hub, means mounting said rotor for rotation, said rotor comprising a plurality of segments, said segments each having a concave surface rearwardly of and adjacent the leading edge thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, an opening in each said segment in the trailing edge portion thereof communicating with said passage, means intermittently communicating said passage in each of said segments with a respective conduit means of one of said segments, a plurality of radially extending, stationary, curved vanes above said rotor, and a plurality of radially extending, stationary vanes above said curved vanes.

7. An airfoil device comprising a rotor including a hollow hub, means mounting said rotor for rotation, said rotor comprising a plurality of segments, said segments each having a concave surface rearwardly of and adjacent the leading edge thereof, the leading edge of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, an opening in each said segment in the trailing edge portion thereof communicating with said passage, means intermittently communicating said passage in each of said segments with a respective conduit means of one of said segments, and a plurality of radially extending, stationary vanes above said rotor.

8. In an airfoil device, the combination comprising, a rotor including a hollow hub, said rotor comprising a plurality of segments, said segments each having a concave surface rearwardly of and adjacent the leading edge portion thereof, the leading edge of each segment being positioned outwardly relative to the central portion thereof and being convex longitudinally, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, and an opening in each said segment in the trailing edge portion thereof communicating with said passage.

9. In an airfoil device, the combination comprising, a rotor including a hollow hub, said rotor comprising a plurality of segments, said segments each having a concave surface rearwardly of and adjacent the leading edge portion thereof, the leading edge portion of each segment being positioned outwardly relative to the central portion thereof, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, and an opening in each said segment in the trailing edge portion thereof communicating with said passage.

10. In an airfoil device, the combination comprising, a rotor including a hollow hub, said rotor comprising a plurality of segments, said segments each having a concave surface rearwardly of and adjacent the leading edge portion thereof, the leading edge portion of each segment being positioned outwardly relative to the central portion thereof, openings in said concave surface of each said segment, a manifold connecting said openings with the interior of said hollow hub, a passage in each said segment in the trailing edge portion thereof communicating with the interior of said hollow hub at a point spaced vertically from the point of communication of said manifold therewith, and an opening in each said segment in the trailing edge portion thereof communicating with said passage.

11. In an airfoil device, the combination comprising, a rotor including a hollow hub, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced from the point of communication of said conduit means therewith, and an opening in each said segment in the trailing edge portion thereof communicating with said passage.

12. In an airfoil device, the combination comprising, a rotor including a hollow hub, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced from the point of communication of said conduit means therewith, the trailing edge portion of each segment having a concave surface, and an opening in each said segment in the trailing edge portion thereof communicating with said passage.

13. An airfoil device comprising a rotor including a hollow hub, means mounting said rotor for rotation, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, an opening in each said segment in the trailing edge portion thereof communicating with said passage, and means intermittently communicating said passages in alternate segments simultaneously with respective manifolds of intermediate segments.

14. An airfoil device comprising a rotor including a hollow hub, means mounting said rotor for rotation, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, conduit means connecting said opening with the interior of said hollow hub, a passage in each said segment in the trailing edge portion thereof communicating with the interior of said hollow hub at a point spaced vertically from the point of communication of said conduit means therewith, an opening in each said segment in the trailing edge portion thereof communicating with said passage, and means intermittently communicating said passages in alternate segments simultaneously with respective conduit means of intermediate segments, said last means also intermittently communicating said passages in said intermediate segments simultaneously with respective conduit means of said alternate segments.

15. In an airfoil device, the combination comprising, a rotor including a hub portion, said rotor comprising a plurality of segments, said segments each having a concave surface rearwardly of and adjacent the leading edge portion thereof, the leading edge portion of each segment being positioned outwardly relative to the central portion thereof, an opening in said concave surface of each said segment, a passage extending from said opening to said hub portion, said passage being open at said hub portion, a second passage in each said segment in the trailing-edge portion thereof, said second passage extending to and being open at said hub portion at a point spaced from the point at which said first passage opens at said hub portion, and an opening in each said segment in the trailing edge portion thereof communicating with said second passage.

16. In an apparatus for creating a thrust or traction effort, an airfoil comprising a plurality of connected segments, said segments each having a concave surface rearwardly of and adjacent the leading edge portion thereof, and said leading edge portion of each segment being positioned outwardly relative to the central portion thereof, an opening in said concave surface of each said segment, a plurality of conduit means each communicating with one of said openings, an opening in each said segment in the trailing edge portion thereof, a passage in each said segment in the trailing edge portion thereof communicating with last mentioned opening, and means for intermittently communicating said passage in each of said segments with a respective conduit means of one of said segments.

17. In an apparatus for creating a thrust or traction effort, an airfoil comprising a plurality of connected segments, said segments each having a concave surface rearwardly of and adjacent the leading edge portion thereof, and said leading edge portion of each segment being positioned outwardly relative to the central portion thereof, an opening in said concave surface of each said segment, a plurality of conduit means each communicating with one of said openings, an opening in each said segment in the trailing edge portion thereof, a passage in each said segment in the trailing edge portion thereof communicating with said last mentioned opening, and means for intermittently communicating said passages in alternate segments simultaneously with respective conduit means of intermediate segments.

HOWELL F. SHANNON.

REFERENCES CITED

The following references are of record in the file of this patent:

UNITED STATES PATENTS

| Number | Name | Date |
|---|---|---|
| 2,413,372 | Paulson | Dec. 31, 1946 |